US011903904B2

(12) United States Patent
Ramadi et al.

(10) Patent No.: US 11,903,904 B2
(45) Date of Patent: Feb. 20, 2024

(54) SYSTEM FOR PRECISE MEASUREMENT AND DISPENSING OF LIQUIDS

(71) Applicants: Khalil Ramadi, Brookline, MA (US); Shriya Srinivasan, Cambridge, MA (US); Sai Nithin Reddy Kantareddy, Cambridge, MA (US); Nevan Hanumara, Kingston, RI (US); Ebenezer Nkwate, Livermore, CA (US)

(72) Inventors: Khalil Ramadi, Brookline, MA (US); Shriya Srinivasan, Cambridge, MA (US); Sai Nithin Reddy Kantareddy, Cambridge, MA (US); Nevan Hanumara, Kingston, RI (US); Ebenezer Nkwate, Livermore, CA (US)

( * ) Notice: Subject to any disclaimer, the term of this patent is extended or adjusted under 35 U.S.C. 154(b) by 848 days.

(21) Appl. No.: 16/617,915

(22) PCT Filed: May 30, 2018

(86) PCT No.: PCT/US2018/035108
§ 371 (c)(1),
(2) Date: Nov. 27, 2019

(87) PCT Pub. No.: WO2018/222698
PCT Pub. Date: Dec. 6, 2018

(65) Prior Publication Data

US 2020/0085693 A1 Mar. 19, 2020

Related U.S. Application Data

(60) Provisional application No. 62/512,400, filed on May 30, 2017.

(51) Int. Cl.
*A61J 7/00* (2006.01)

(52) U.S. Cl.
CPC .......... *A61J 7/0023* (2013.01); *A61J 7/0053* (2013.01)

(58) Field of Classification Search
CPC .......... A61J 7/00; A61J 7/0023; A61J 7/0053; A61J 7/0409; A61J 7/0436; A61J 7/0481; B05B 13/04; A47G 21/04; A47L 15/4244; D06F 39/087
See application file for complete search history.

(56) References Cited

U.S. PATENT DOCUMENTS

| | | | | |
|---|---|---|---|---|
| 147,909 A * | 2/1874 | Curtiss | A61J 7/0053 | 604/77 |
| 260,457 A * | 7/1882 | Cooper | A61J 7/0053 | 604/77 |
| 2,698,996 A * | 1/1955 | Hickerson | A61J 7/0023 | 30/324 |
| 2,837,822 A * | 6/1958 | Wille | A61J 7/0023 | 30/324 |

(Continued)

*Primary Examiner* — Jason Daniel Prone
(74) *Attorney, Agent, or Firm* — Nelson Mullins Riley & Scarborough LLP; Anthony A. Laurentano

(57) ABSTRACT

A dispenser device for dispensing fluids is described. The dispenser can include a reservoir cap that can directly attach to and replace the screw top cap of traditional screw top bottle. The reservoir cap includes an air reservoir that can facilitate movement of the fluid through the device. The reservoir cap is coupled to a dispenser that is configured to receive the fluid from the cap. The dispenser can be detached from the cap and used to directly dispense the fluid.

12 Claims, 10 Drawing Sheets

(56) References Cited

U.S. PATENT DOCUMENTS 3,071,272 A * 1/1963 Doner .................. A61J 7/0023 D24/194
3,259,132 A * 7/1966 Katter .................. A61J 7/0053 30/324
4,091,965 A * 5/1978 Gebhard .............. A61J 7/0023 222/548
4,192,360 A * 3/1980 Rodriquez ............ A61J 7/0023 604/77
4,373,640 A * 2/1983 Resio .................... A61J 7/0023 215/DIG. 5
4,724,615 A * 2/1988 Mackles ............... A61J 7/0023 30/326
4,821,895 A * 4/1989 Roskilly ............... A61J 7/0053 215/DIG. 8
4,957,226 A * 9/1990 Pacia .................... A61J 7/0053 222/108
5,137,183 A * 8/1992 Mikulec ................ A61J 7/0053 222/525
5,305,928 A * 4/1994 Verdaguer ............ B65D 51/246 222/205
5,318,523 A * 6/1994 Lu ......................... A61J 7/0053 604/77
5,330,081 A * 7/1994 Davenport ............. B65D 1/323 222/207
5,377,879 A * 1/1995 Isaacs .................. A61J 7/0053 604/77
5,462,101 A * 10/1995 Mouchmouchian .. A61J 7/0053 222/205
5,491,895 A * 2/1996 Lee ....................... A61J 7/0023 30/125
5,556,008 A * 9/1996 Silver .................. A61J 7/0023 30/141
5,645,534 A * 7/1997 Chanoch ........... A61M 5/31551 604/211
5,682,931 A * 11/1997 Mouchmouchian .. A61J 7/0053 222/205
5,833,124 A * 11/1998 Groves ................. G01F 11/286 222/205
5,881,926 A * 3/1999 Ross ..................... A61J 7/0023 222/153.06
6,056,135 A * 5/2000 Widman ............... A61J 7/0053 604/415
6,164,498 A * 12/2000 Faughey ............... A61J 7/0053 222/153.13
6,249,717 B1 * 6/2001 Nicholson ............. A61J 7/0409 222/246
6,279,233 B1 * 8/2001 Cameron .............. A61J 7/0023 30/324
6,330,960 B1 * 12/2001 Faughey .............. B65D 50/045 222/205
6,675,482 B1 * 1/2004 Gilbert, Jr. ............ A61J 7/0053 30/125
6,684,918 B1 * 2/2004 Thilly ................... A61J 7/0053 604/414
8,020,303 B1 * 9/2011 Marsh .................. A47G 21/004 30/324
8,021,342 B2 * 9/2011 Girgis ................... A61J 7/0053 604/211
D657,867 S * 4/2012 Effenberger ................. D24/114
8,651,305 B1 * 2/2014 Lunn ..................... A61J 1/1418 604/415
9,302,052 B1 * 4/2016 Rafaat ............... A61M 5/31595
9,423,285 B2 * 8/2016 Barton .................. A61J 1/1418
9,566,388 B1 * 2/2017 Jones .................... A61J 1/2096
10,875,688 B1 * 12/2020 Hawry .................. A61J 7/0053
11,285,084 B2 * 3/2022 Roux .................... A61J 7/0023 D24/114
2005/0070853 A1 * 3/2005 Gatton .................. A61J 7/0053 604/195
2007/0214692 A1 * 9/2007 Ferrara ................. A61J 7/0023 40/324
2009/0227943 A1 * 9/2009 Schultz ................. A61J 7/0023 604/77
2009/0302063 A1 * 12/2009 Maas .................... G01F 11/286 222/207
2012/0103462 A1 * 5/2012 Levy ..................... A61J 7/0053 141/311 R
2012/0216909 A1 * 8/2012 Levy ..................... A61J 7/0053 604/77
2013/0068790 A1 * 3/2013 Patthey ................. A61J 7/0409 222/105
2013/0255831 A1 * 10/2013 Shibasaki ................. A61J 1/00 141/69
2013/0306647 A1 * 11/2013 Sachdev ............... A61J 7/0023 215/228
2016/0067143 A1 * 3/2016 Ferrara ................. A61J 7/0053 604/404
2016/0143812 A1 * 5/2016 Boudy .................. A61J 1/2096 141/27
2020/0281816 A1 * 9/2020 Berri ..................... A61J 7/0053
2020/0367679 A1 * 11/2020 Leffler .................. A61J 7/0023
2021/0275399 A1 * 9/2021 Meyer ............... A61M 5/31595

* cited by examiner

REPLACEMENT SHEET

SYSTEM FOR PRECISE MEASUREMENT AND DISPENSING OF LIQUIDS

REFERENCE TO RELATED APPLICATIONS

Application claims the benefit of and priority to U.S. Provisional Application No. 62/512,400, filed on May 30, 2017 and is the National Stage of International Application No. PCT/US2018/035108 filed on May 30, 2018. The entire teachings of the earlier applications are incorporated herein by reference.

FIELD

The present invention relates to methods, systems, and corresponding apparatus for dispensing liquids, and more particularly to methods, systems, and corresponding apparatus for dispensing liquids.

BACKGROUND

In the medical industry, there is a high rate of overdose of liquid medication in infants. Liquid acetaminophen (also called paracetamol) is an example of a drug on which infants can commonly overdose. Almost 70,000 infants are admitted to the emergency room yearly in the U.S. for liquid acetaminophen overdose. Studies have attributed this high rate of overdose to errors in dosing, which can often arise from two primary categories of challenges. First, measuring devices, namely syringes and measuring caps, that are commonly distributed with liquid medication can have errors in the markings due to poor quality control, manufacturing, or repeated use. Such measurement errors can give rise to approximately 85% of error cases. Second, caregivers often struggle to accurately measure and dispense the required volume due to limitations in education, device usability, cognition, fatigue, etc.

Further, although syringes and measuring caps are theoretically easy devices to use, these devices do not always have inherent mechanisms to ensure that the desired volume is precisely measured and/or dispensed. Furthermore, such measurement means cannot be easily initialized at a specific volume that can be used for multiple future applications without having to be reset.

Finally, current devices used for medication measuring and dispensing are often not engineered for high viscosity fluids (e.g., fluid having suspension levels in which most drugs are offered) and, therefore, can suffer losses in delivery of viscous fluid to this endpoint. There can also be spillage and leaking from the device, which can lead to incorrect dosing and possibly lead to attempts to compensate for this by purposely overdosing.

Further, in automobile, chemical, processing, and food/cooking industries, there is a broad need for obtaining measurements of viscous fluids (e.g., viscous oils and syrups) in exact volumes for either proper machine performance or completion of recipes. However, commonly used measurement cups can be very inaccurate because they cannot be used to set and/or memorize a desired volume. Measurements obtained with these devices can also be vulnerable to human errors due to factors, such as negligence or product-illiteracy of the user. Product loss can further occur due to viscous fluids not being fully cleared from the measurement device.

SUMMARY

The present disclosure advantageously fills the aforementioned deficiencies by providing methods, systems, and apparatus that can measure fluids and dispense fluids while minimizing liquid volume loss.

In one aspect, a device comprising a cap and a detachable dispenser is disclosed. The cap comprises a first port configured to be coupled to a container holding a fluid therein and receive the fluid from the container, a second port, and an air reservoir configured to facilitate movement of the fluid through the cap. The detachable dispenser is coupled to the second port of the cap and configured to receive the fluid from the cap.

In another aspect, a container cap for closing a container holding a fluid therein is disclosed. The container cap comprises a first port configured to be coupled to the container and receive the fluid from the container, an air reservoir configured to facilitate movement of the fluid through the container cap, and a second port comprising at least one valve configured to close the container cap and prevent movement of fluid therefrom.

In other examples, any of the aspects above, or any system, method, or apparatus described herein can include one or more of the following features.

The detachable dispenser can comprise a rounded edge. For example, the detachable dispenser can comprise a spoon feature defining a rounded edge.

The device can further comprise an adjustable volume control component coupled to the detachable dispenser. The adjustable volume control component can be an adjustable screw configured to adjust volume of the fluid received from the cap by the detachable dispenser. The fluid can be a viscous fluid. Further, the adjustable volume control component can be configured to adjust volume of the fluid to a predetermined volume. Furthermore, the adjustable volume control component can include one or more markings for adjusting the volume of the fluid to one or more specific volumes. The one or more markings are etched into the adjustable volume control component. Additionally or alternatively, the adjustable volume control component can comprise a seal configured to prevent leakage.

The container can be a screw top container and the first port of the device can be configured to be coupled to threads of the screw top container to close the container.

Further, the detachable dispenser can comprise a barrel disposed at an angle less than 90 degrees with respect to normal.

In some embodiments, the cap can further comprise a display configured to alert a user of at least one of amount of the fluid to dispense using the device and time for dispensing the fluid using the device. Additionally or alternatively, the device can comprise at least one of a visual or an audio indicator configured to alert a user to use the device at predetermined time intervals. By way of example, the visual indicator can be an LED lamp configured to turn on or off at the predetermined time intervals.

In some embodiments, the cap and the detachable dispenser can comprise complementary features configured to couple the detachable dispenser to the second port of the cap. The detachable dispenser can comprise one or more features configured to catch spills and leaks of the fluid received from the cap.

Additionally or alternatively, the device can include a processor configured to control operation of the device. The processor can be configured to control at least one of amount of the fluid to dispense using the device and time for dispensing the fluid using the device.

Further, the device can include a communications interface configured to connect the device to at least one of a nearby communications interface of another device of a communications network. By way of example, the communications interface can be a Bluetooth chip.

In some embodiments, the device can comprise a timer configured to monitor a time at which the fluid is dispensed. The timer can be configured to alert a user at predetermined time interval to dispense the fluid using the device. Additionally or alternatively, the timer can be configured to activate to monitor the time upon attachment of the cap to the detachable dispenser.

In some embodiments, the cap can further comprise a sensor configured to monitor at least one of amount of the fluid to dispense using the device and time for dispensing the fluid using the device. The sensor can be at least one of an infrared sensor, an ultrasonic sensor, a mechanical switch, and an electrical switch.

The second port of the container cap can connect to a detachable dispenser. The at least one valve can be configured to open to allow movement of the fluid out of the cap and into the detachable dispenser. The cap and the detachable dispenser comprise complementary features configured to couple the detachable dispenser to the second port of the cap.

Other aspects and advantages of the invention can become apparent from the following drawings and description, all of which illustrate the principles of the invention, by way of example only.

BRIEF DESCRIPTION OF THE DRAWINGS

Features and advantages of the invention described herein, together with further advantages, may be better understood by referring to the following description taken in conjunction with the accompanying drawings. The drawings are not necessarily to scale, emphasis instead is generally placed upon illustrating the principles of the invention.

DETAILED DESCRIPTION

Figure 1:
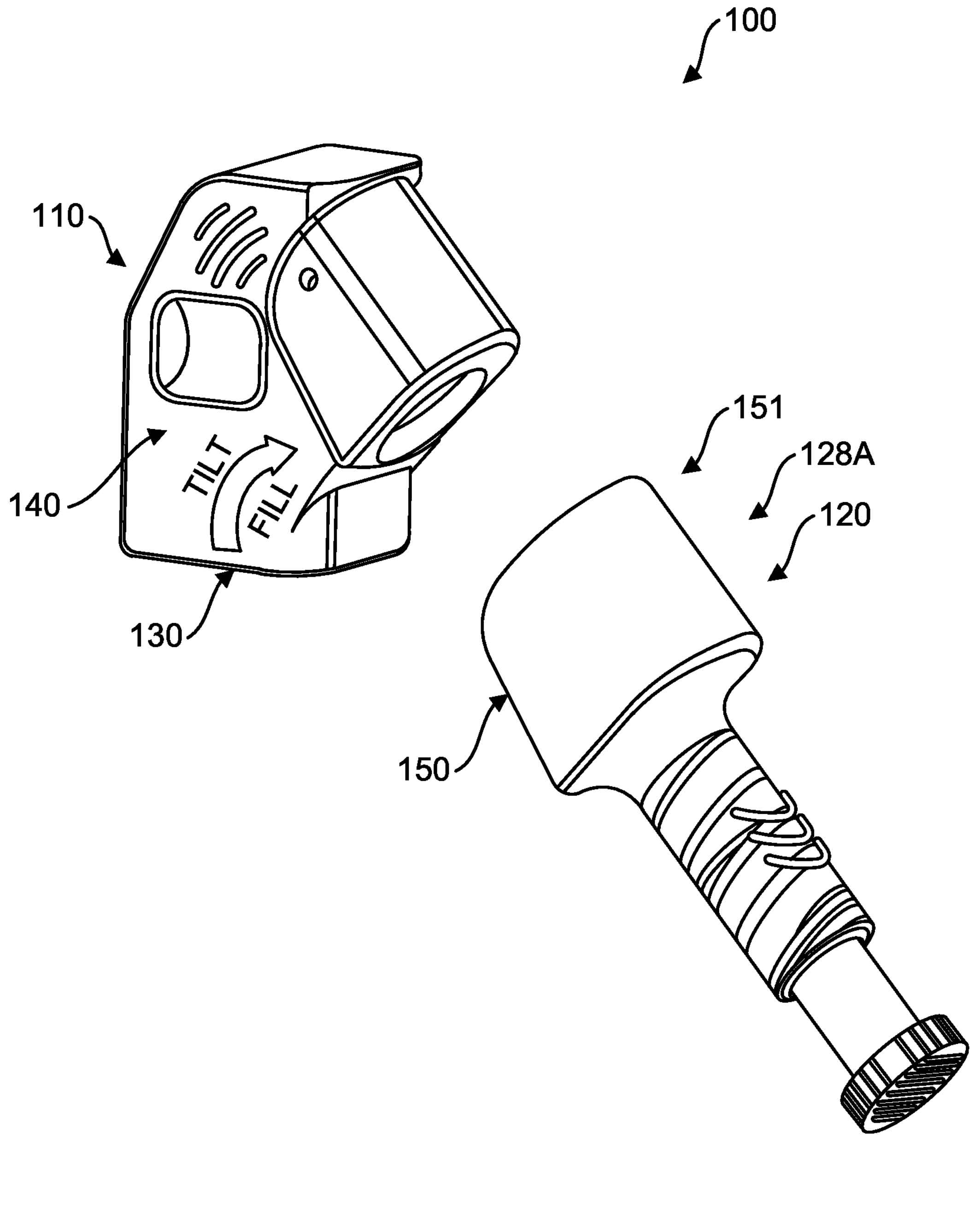
FIG. 1 illustrates a device for dispending fluids according to some embodiments disclosed herein.

The present disclosure relates to methods and corresponding system and apparatus for dispending fluids such as liquids. Although described generally in terms of viscus fluids, embodiments disclosed herein can be used with any type of fluids having varying viscosities. The pediatric population (i.e., children younger than eight years of age) is often especially sensitive to medication overdose, given the low bodyweight range and systemic delivery of common medications. In fact, children can be three times more susceptible to overdose and related complications than adults. For example, a report from the American Association of Poison Control Centers and American Academy of Pediatrics demonstrates that in 238 cases of medication error for children six years and younger, incorrect dosing was the most common error and also most prevalent among children less than one year of age. Such errors appear to be more common when less than 1 mL of the medication is to be given. Furthermore, studies have reported narrow therapeutic windows for drugs such as acetaminophen, where hepatotoxicity may result from a single acetaminophen dose of 120 to 150 mg/kg of body weight in children. There exists a large volume of literature describing pediatric overdose and resulting negative sequelae due to acetaminophen, astemizole, xylometazoline, and ketamine. Adverse effects can include liver failure, heart failure, and possibly death.

Most medications for the pediatric population are formulated as liquid suspensions or colloids, as they are easier to administer to infants than pills or capsules. Consequently, the responsibility of accurately measuring the dose is often shifted to the caretaker. The primary measuring devices used today are oral syringes and measuring cups, which have remained unchanged for decades and lack inherent functionality to ensure accurate, consistent dosing of liquid medication. Furthermore, both the syringe and measuring cup rely heavily on a user's handling for proper functionality.

Dosing errors can lead to over 70,000 yearly pediatric overdose cases landing in the emergency department in the U.S. Furthermore, reports appear to indicate that the reported rate of accidental medication poisoning has doubled from 36% to 64% since 2006. This high incidence with both over-the-counter (OTC) and prescription medications can result from parents' difficulty in understanding non-uniform units (e.g., milligrams, milliliters, ounces) and often insufficient unit labels on standard dosing cups and syringes. Additionally, factors such as possible manufacturing defects and frequent washing between uses can cause the markings on many plastic syringes to fade, become inaccurate or visually invisible.

Medication errors can generally be classified into four different categories based on their error-origins: (1) prescribing errors, (2) transcribing errors, (3) dispensing errors, and (4) administering errors. Dispensing errors are the typically the predominant source of medication overdose in pediatric patient population.

Embodiments disclosed herein relate to methods, systems, and apparatus for precise dispensing of medications that can improve dosing accuracy and precision and reduce errors in dispensing and administration of medications.

FIG. 1 illustrates a precision medication dispenser (PMD) device 100 for dispending fluids according to some embodiments disclosed herein. The term "viscous fluid," as used herein, is intended to refer to any viscous fluid known and available in the art. Although described in terms of viscous medications that are dispensed to patients (possibly human patients), one of ordinary skill in the art should appreciate that viscous medications are only an example of the types of fluids that can be dispensed using the embodiments disclosed herein. Embodiments disclosed herein can generally be used to dispense any type of fluids in any suitable application known in the art. Further, although fluids having any amount of viscosity can be used with the embodiments disclosed herein, in some embodiments, fluids can have viscosities ranging from 1 cP (centipoise) to 010 cP.

The device 100 can optimize the handling of various fluids. Further, the device 100 can be configured such that it can fit onto standard medication bottles directly and/or possibly replace existing medication bottle caps. The device 100 can further enable a user to dispense the medication directly, without requiring secondary measurement means such as cups and syringes, thereby preventing fluid losses that can occur during transfer from the bottle to the measurement means and while dispensing using the measurement means to the person receiving the medication.

As shown in FIG. 1, the device 100 can be a multi-component device. For example, in the example shown in FIG. 1, the device 100 is a two-component device having a cap 110 and a dispenser 120. The cap 110 can be a mounted reservoir cap. The reservoir cap can comprise a reservoir and/or volume chamber 140 that is configured to mitigate airlock or bubbling during filling. Specifically, the reservoir cap can be configured to hold the additional air and volume displaced during the tilting or dispensing action. The inclusion of an air reservoir in the cap can prevent blockage of the liquid flow path, which can, otherwise, happen by air exerting pressure in the opposite direction. In some embodiments, the chamber can be large enough to hold at least 5 ml of fluid. Generally, reservoirs having any suitable size can be used. The cap 110 can further comprise a port 130 that is configured to be coupled to a container (e.g., bottle) that contains a liquid material (e.g., a medication bottle). For example, the cap 110 can be configured to attach to the top of a standard medication bottle, through the port 130, via a standard child-proof screw-thread mechanism. Since the device 100 can directly fit onto and/or be coupled with a medication bottle, it can mitigate medication loss that can result from using a separate measuring device. Medication loss can further be mitigated through the large air space that is included in the volume chamber 140 of the device, which is configured to prevent bubbling or air-lock. Further, the PMD device 100 can help in preventing overdose by improving accuracy of dosage volume. Further, as described in more details below, volume markings 662 (FIG. 6B) can be etched into the device 100 to prevent deterioration of printed markings 662 after repeated use.

The dispenser 120 can be a detachable dispenser that includes an end portion 150 configured for dispensing the fluid (e.g., medication). For example, the end portion 150 of the detachable dispenser 120 can include a spoon feature 151 that can be used to directly dispense the medication to a patient. The spoon feature 151 defines rounded edges 128A. The detachable dispenser 120 can be used to tune the dispensed dosage volume to any desired volume. For example, the detachable dispenser 120 can operate between 1-5 ml, which is a common dosing volume for common medications used for children.

Figure 2A:
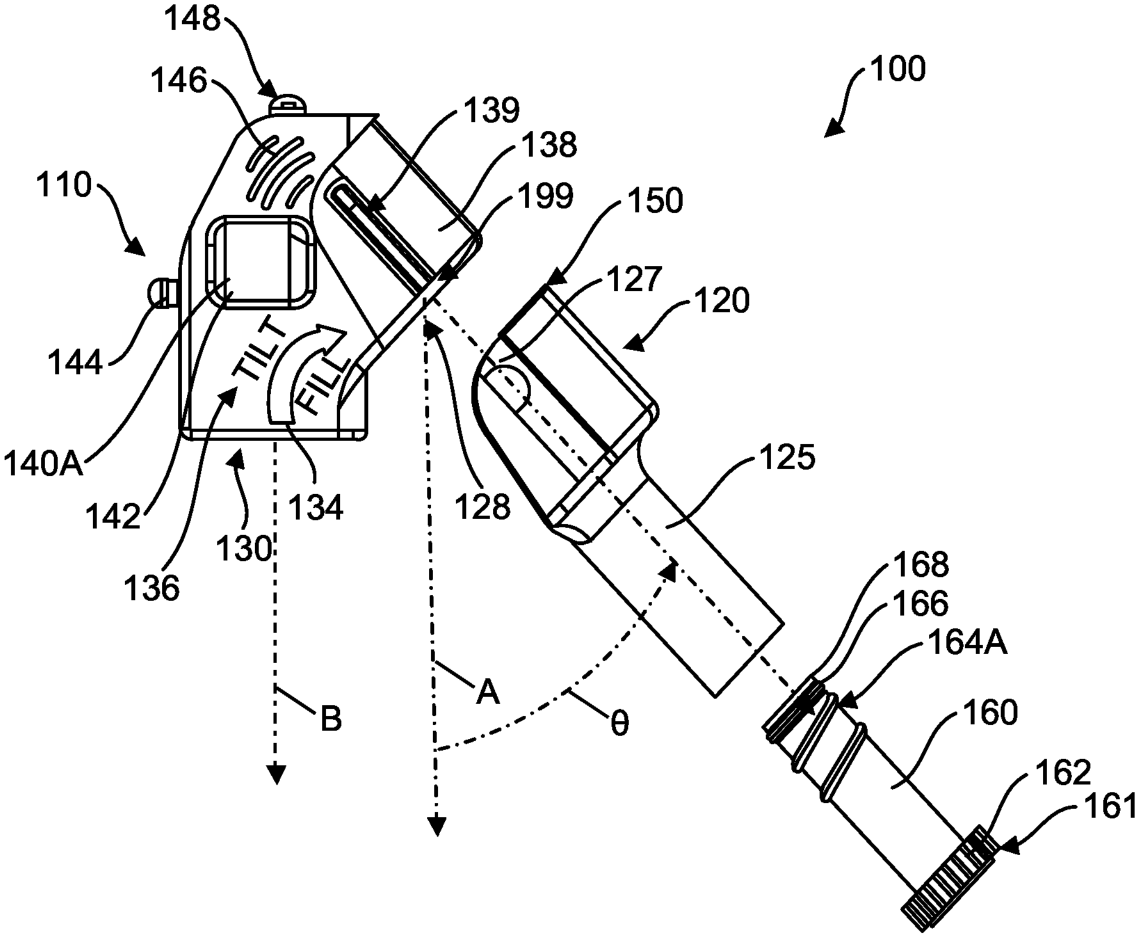
FIG. 2A depicts the device shown in FIG. 1 in a disassembled format.
Figure 2B:
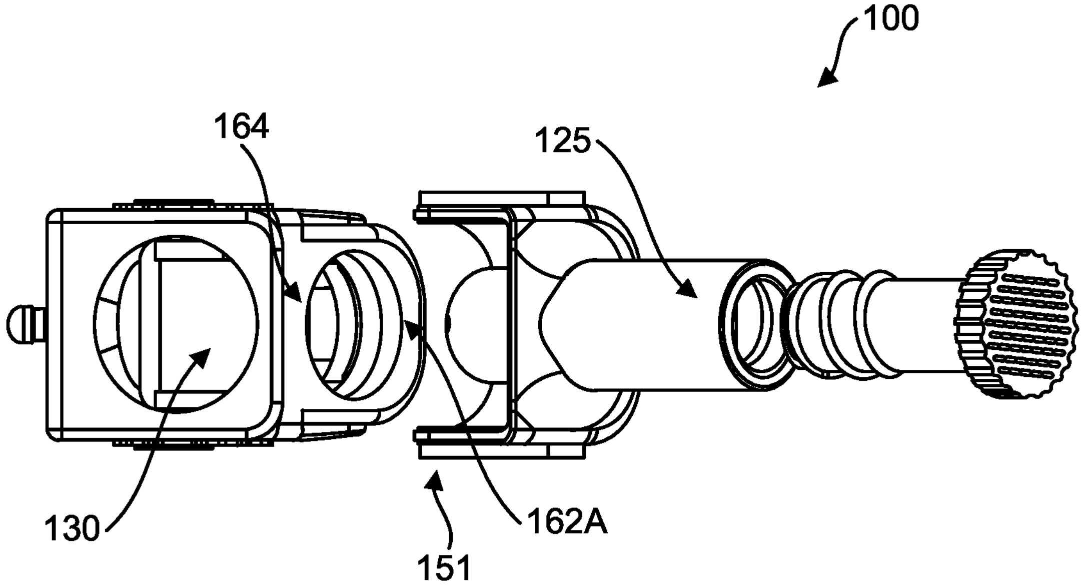
FIG. 2B depicts a side view of the device shown in FIG. 1 in a disassembled format.

FIG. 2A-2B illustrate the PMD device 100 in a disassembled format. As shown in FIG. 2A, the device 100 can include a two-component device having a cap 110 and a dispenser 120, which is coupled to a volume control component 160. The volume control component 160 can be an adjustable screw, configured to set an intended volume for the fluid being dispensed. The intended amount of the dispensed fluid can be pre-set and/or predetermined amount. Alternatively or additionally, the intended amount can be an amount set or adjusted further. For example, the intended amount can be an amount that is adjusted at the time and/or before the device 100 is used. Once the intended amount is set, the dispenser 120 can be used repeatedly for administering multiple doses having the same volume. Upon further adjustment, the dispenser 120 can be used for administering varying volumes of fluids. Further, as shown later with reference to FIG. 6B, the volume control component 160 can include one or more markings 662 for adjusting the intended volume of the fluid. The one or more markings 662 can be included in the volume control component 160 using any technique known in the art. For example, the markings 662 can be etched or printed into the volume control component 160.

As noted, the cap 110 can be configured such that it can fit onto standard/common liquid container (medication bottle) threads. Once connected to a liquid container, the device 100 can be titled to allow for transfer of fluid from the container to the dispenser 120, through the cap 110. The dispenser 120 can include a beveled barrel or tube 125 (e.g., beveled cylindrical tube), which is beveled at an angle less than 90 degrees with respect to normal and configured to receive the fluid once the device and/or container is tilted. The barrel 125 includes a first opening at a first side and a second opening at a second side, and the barrel 125 extends in a longitudinal direction between these openings as illustrated in FIG. 2A. The barrel or tube 125 can be configured at any suitable angle with respect to normal. For example, the longitudinal direction of the barrel 125 can form a 45 degree angle with normal. This angle θ, shown in FIG. 2A, can range from 0 degree to 90 degrees depending on various factors including, but not limited to, fluid properties, aesthetics, user interaction and packaging. Generally, devices having larger angles (e.g., closer to 90 degrees) have a lower overall footprint. During the tilting action to fill the dispenser with the fluid, the rate at which the air is displaced by the fluid can be dependent on this angle. As noted, the beveled cylinder 125 can be coupled with a volume control component 160. The volume control component 160 can be a screw mechanism, configured to allow for setting the dispensed volume of the fluid/medication at varying volumes.

The volume control component 160 can include one or more features for setting and/or holding the volume and one or more volume lock features 162. For example, the features can give haptic feedback to the user while setting the volume by feeding the volume control component 160 into the barrel 125. To prevent accidental volume changes, the flexural feature 139 or the one or more volume lock features 162 provide a child lock functionality. This flexural feature 139 requires the user to apply more force to unlock the volume control component 160 from its position, thereby preventing a child from accidentally opening unlocking the volume control component 160. The child lock functionality can further be configured to require simultaneous application of a downward force and sideways twisting of the cap 110.

The volume control component 160 can also include one or more features for leak prevention. For example, as shown in FIG. 2A, the volume control component 160 can include at least one of a modified edge 168 configured to prevent leakage and/or an O-ring or a seal 166 to prevent leaks. The volume control component 160 can also include a reduced number of threads 164A for setting the volume of the fluid being dispensed. The seal 166 can be a loop of elastomer, having a round or rectangular cross-section, which is configured to act as a mechanical gasket. The seal 166 can prevent liquids from flowing across the seal 166. The modified edge 168 can have a tight tolerance with the barrel 125 that is configured to provide resistance to liquids and prevent such fluids from flowing across the beveled cylinder. Common plunger syringes do not have grooves inside their barrels and, as such, can operate using a simple/traditional plunger mechanism. In contrast, the dispenser 120 comprises one or more grooves, which along with the O-ring and the edge can efficiently prevent any liquids from flowing through the grooves. Moreover, typical plungers can be continuous in their measurement, thereby resulting in measurement inaccuracies. In contrast, the volume control component 160 can include one or more discrete stops at specified volumes (e.g., 5 ml, 10 ml, 15 ml, 20 ml, etc.), allowing the user to set the volume control component 160 to a desired stop (e.g., 5 ml).

The connection interface between the barrel 125 and the cap 110 and/or the connection interface between the barrel 125 and the volume control component 160 can include one or more valves 199. The valves can be arranged such that once the dispenser 120 is detached from the cap 110, the leftover fluid in the cap 110 returns into the bottle. Specifically, the valves 199 can serve as stoppers that prevent excess fluid from flowing out of the cap 110. The valves can be configured such that they remain open while the dispenser 120 and the cap 110 are coupled, thereby leaving open a path for the fluid to flow from the cap 110 to the dispenser 120. The valves 199 can further be configured such that they close once the dispenser 120 is detached from the cap 110, thereby preventing excess fluid from flowing out of the cap 110.

The device 100 can further be configured such that once a desired volume is set (e.g., using the volume control component 160), the volume need not be changed across dosing cycles, precluding the user from having to reset the volume. Alternatively or additionally, this volume can be locked on setup to prevent the user from changing the dispensed volume. The interface of the barrel 125 to the main cap 110 can contain one or more additional flow control features, configured to prevent leakage and spillage as fluid from the top of the device 100 settles down. For example, spillage can be reduced by a seal or an optional valve at the port where the barrel 125 interfaces with the cap 110. This spillage is also reduced by a lip like feature embossed onto the edge of the interface such that the excess fluid is directed back into the container, preventing potential spills.

As noted, the volume control component 160 can be preset to a predetermined volume and configured to limit the amount of fluid transferred from the cap 110 into the dispenser 120. Therefore, upon tilting the container and/or the device 100, a predetermined amount of fluid (as limited by the volume control component 160) is transferred from the fluid container through the cap 110 to the dispenser 120. The device 100 can include one or more features configured to indicate whether a sufficient amount of liquid has entered the device 100. For example, the device 100 can include one or more features that can be used to assist the user in determining whether a sufficient amount of fluid has been moved from the container into the device 100. In one embodiment, at least one feature can be an indicator that shows the progression of fluid transfer. For example, the arrow 134 shown on FIG. 2A, can be transparent or have a certain color (e.g., red) that changes (e.g., turns blue or green) as the dispenser is filled (e.g., turns completely blue or green indicating that the dispenser is filled to the predetermined amount and that the user no longer needs to keep the container and/or the device 100 tilted). Additionally or alternatively, the device 100 can be transparent to allow for visual inspection of fluid being transferred into the device and/or dispensed using the device.

As noted, the dispenser 120 can be an integrated, detachable dispenser 120 that can be coupled to the cap 110 and removed and/or detached to dispense liquids, and the dispenser 120 may have a spoon feature 151. The cap 110 can include a lip feature 128 that is configured to catch spills and leaks during measurement (when the cap 110 is coupled to the dispenser 120) and while dispensing (when the dispenser 120 is detached from the cap 110 and used for dispensing). Additionally or alternatively, the dispenser 120 can include an adjustable volume component, formed by the barrel 125 and the volume control component 160 that is configured to control and limit the volume of the liquid dispensed using the dispenser. Further, the walls of the dispenser 120 can be rounded and configured to promote fluid flow and prevent fluid retention. Additionally or alternatively, the dimensions of the barrel 125 of the dispenser 120 can be optimized to prevent airlock and force fluid down a natural gravitational gradient.

Further, the device 100 can include one or more components configured to automatically provide a visual and/or audio reminder of the time at which a medication should be administered. For example, the device 100 can include an adjustable timer 952 (FIG. 9) configured to alert a user at predetermined time intervals (e.g., every six hours) to administer the medication. The timer 952 can be implemented using, for example, at least one of a magnetic switch, a sensor 951 (FIG. 9) such as a pressure sensor or an IR sensor, an electrical connection, or a mechanical switch. The sensor 951 may be positioned in the cap 110.

Additionally or alternatively, the device 100 can have integrated wireless capabilities that allows the device to communicate with other wireless enabled devices. For example, the device 100 can include Bluetooth capabilities that allow the device 100 to communicate with other wireless devices and receive instructions for dispensing and/or administering medication. The instructions can include at least one of the time to administer the medication, the amount of medication to administer, and/or time intervals for administering the medication.

Referring back to FIG. 2A, the cap 110 can include one or more features that are configured to visually prompt the user about dosage administration. For example, the cap 110 can include a visual indicator in the form of an LED lamp 148 that is configured to alert the user about dosage administration by turning on/off. The features can also include features that alert the user about the time for administering the next dosage and/or the time remaining before the next dosage is due for administration.

The device 100 can also include one or more features configured to allow the user to comfortably and/or securely handle the device 100. For example, the device 100 can include one or more grip features that are configured to facilitate handling of the device 100. These features can be disposed on any suitable part of the device 100. For example, as shown in FIG. 2A, the cap 110 can include one or more grippers or indentations 140A, one or more additional grip features 146, etc. In some embodiments, the grippers or indentations 140A can include one or more rubber grippers 142 (or similar suitable grippers known and available in the art) to further facilitate handling of the device 100. Such features can be disposed throughout the device 100 to facilitate handling of the device 100. For example, handling features can be included on the barrel 125 or on the volume control component 160.

Generally, the device 100 can be a manually operated device and/or an electrically powered device, such as a battery operated device. As noted, the device 100 can include one or more components to automatically provide a visual and/or audio reminder of the time at which a medication should be administered. The components that provide automatic functions to the device 100 can be battery operated (disposable and/or rechargeable) or configured to receive power from any other electric source known and available in the art. As shown in FIG. 2A, the device 100 can include one or more components 144 that connect the device 100 to a source of electricity. For example, the component 144 can be a port or outlet for connecting the device 100 to a source of electricity.

The device 100 can further include one or more features that allow for secure coupling of the cap 110 to the dispenser 120. The connection between the cap 110 and the dispenser 120 can be made using any features known in the art. For example, the cap 110 and the dispenser 120 can include one or more complementary features that allow for secure coupling of the cap 110 to the dispenser 120. In some embodiments, these features can be snap fit features. For example, as shown in FIG. 2A, the cap 110 can include one or more flexural features 139 that are configured to fit into complementary snap features 127 on the dispenser 120. The cap 110 can also include one or more features, such as ornamental texts, etc., that are configured to guide the user in utilizing the device 100. For example, as shown in FIG. 2A, the device 100 can include text information or instructions 136 that can guide the user in using the device 100. Further, as shown in FIG. 2B, the cap 110, at its interface 164 with the dispenser 120, can include one or more seal features 162A configured to further prevent leakage of fluid. For example, the seal feature 162A may be an elastomeric seal having a cross section (e.g., a round or a rectangular cross-section) can act as a mechanical gasket at the interface 164. The electrometric seal can be configured to maintain a tight mechanical tolerance at the interface 164 that prevents fluids from flowing in the gaps between the cap 110 and the dispenser 120.

The cap 110 can also include one or more mounting features 138 that are configured to facilitate mounting of the cap 110 to the dispenser 120. The mounting feature 138 can be any suitable mounting feature 138 available in the art. For example, the mounting feature 138 can be a mechanical snap-fit feature, a slot-pin feature, and/or a flexure mechanism.

As shown in FIG. 2A, a flexural feature 139 can be used to mount the dispenser 120. The flexural feature 139 can be configured to elastically deform when pressed by snap features 127 on the dispenser while mounting. After the pin reaches the end of the length of the flexural feature 139, the flexural feature 139 releases and returns to its original position, thereby applying a force to hold the dispenser firmly in the mounted position. Dismounting of the dispenser requires a reverse sequence of actions that include simultaneous compression and pulling of the flexural feature. The device 100 can further include child safety or child lock features 722 (shown later in FIG. 7). Specifically, the cap 110 of the PMD device 100 can include a threading that is configured to add a layer of safety to prevent accidental opening by children. A notched lock in the cap 110 can also provide additional protection against accidental opening by a child. The child safety or child lock features 722 together with counter features on the dispenser can be provided in a single piece or a two piece form. As noted previously, the child lock and safety features can be configured such that they require two or more motions to open (e.g., simultaneous squeezing and pushing), thereby making removal by a child difficult. Examples of such motions can include but are not limited to push down and turn motion and/or squeeze and lock" motions.

Figure 3A:
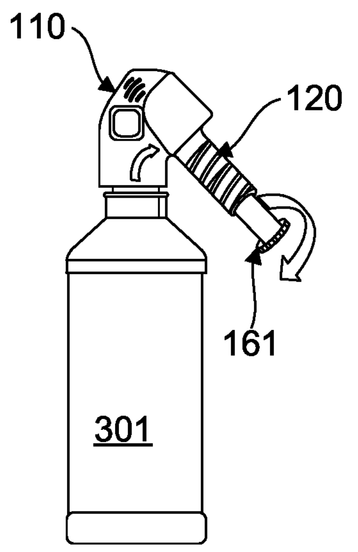
FIGS. 3A-3D illustrate a device for dispending and administering fluids according to some embodiments disclosed herein.

FIGS. 3A-3D illustrate the device 100 before, during, and after use for transferring and dispensing fluids. As noted above, a desired volume of a fluid can be selected by twisting a volume adjuster screw 161 (FIG. 2A) on the detachable dispenser 120. The volume adjuster screw 161 can be adjusted using any suitable available technique. For example, the volume screw 161 can be configured such that each 180 degree turn in the counterclockwise direction increases the volume of dispensed fluid by 0.5 ml. As shown in FIG. 3A, the device 100 can be connected to a fluid container 301 using the port 130 (FIG. 1) of the device 100. The port 130 can be configured such that it can be coupled with any conventional screw top container bottle (such as those typically used for children's medications).

Figure 3B:
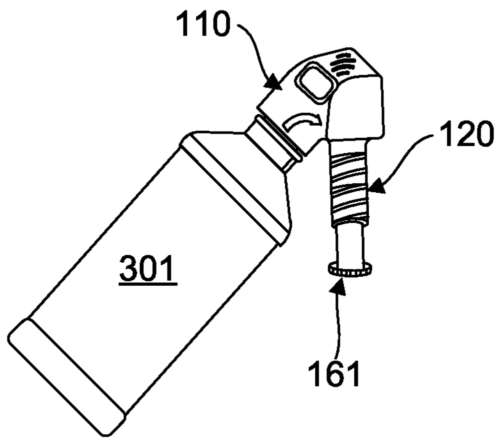
Figure 3C:
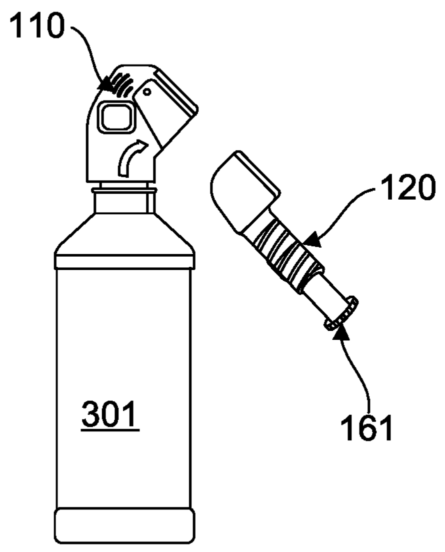
Figure 3D:
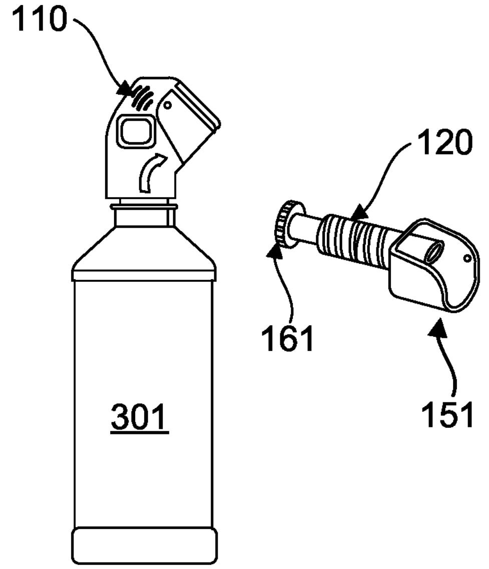

As shown in FIG. 3B, the container 301 or the device 100 can be tilted to fill the cap reservoir or volume chamber 140. As shown in FIG. 3C, upon reversion, fluid flows into the detachable dispenser 120 and levels off at the set volume, with excess flowing directly back into the container 301. As shown in FIG. 3D, the dispenser 120 can be removed/detached from the cap 110 and used (by using the rounded, spoon feature) to administer the fluid (e.g., medication to the patient). Notably, no volume adjustment is required for subsequent administrations, relieving a human component from the dosing process.

One of the key challenges in designing an accurate measurement and dispensing system is ensuring adequate flow of liquids. This can be especially challenging in a closed system, where the lack of air return can prevent gravity-driven fluid flow. Small bottle orifices can be easily occluded by fluid during dispensing due to a block of airflow. Moreover, as long as surface tension forces at the fluid-air interface are not overcome, gravitational pressure alone is the driving force of fluid out of a bottle. Embodiments describe herein model this flow as a laminar Pouseille flow through the outlet nozzle (i.e., the outflow port of the bottle or the port in the cap, which connects to the inside of the detachable dispenser) driven by hydrostatic pressure of the fluid contained within the bottle based on the following relationship:

$$\rho g H = \frac{8\mu L Q}{\pi r^4}$$

where p is the density of the fluid (e.g., 1 kg/m$^3$), g is the gravitational constant (e.g., 9.8 m/s$^2$), H is the height of the liquid in the bottle when inverted, p is the viscosity of the liquid (e.g., 1.9 cP for water), L is the length of the nozzle (e.g., 0.5 cm), Q is the flow rate out of the nozzle, and r is the diameter of the nozzle.

Figure 4:
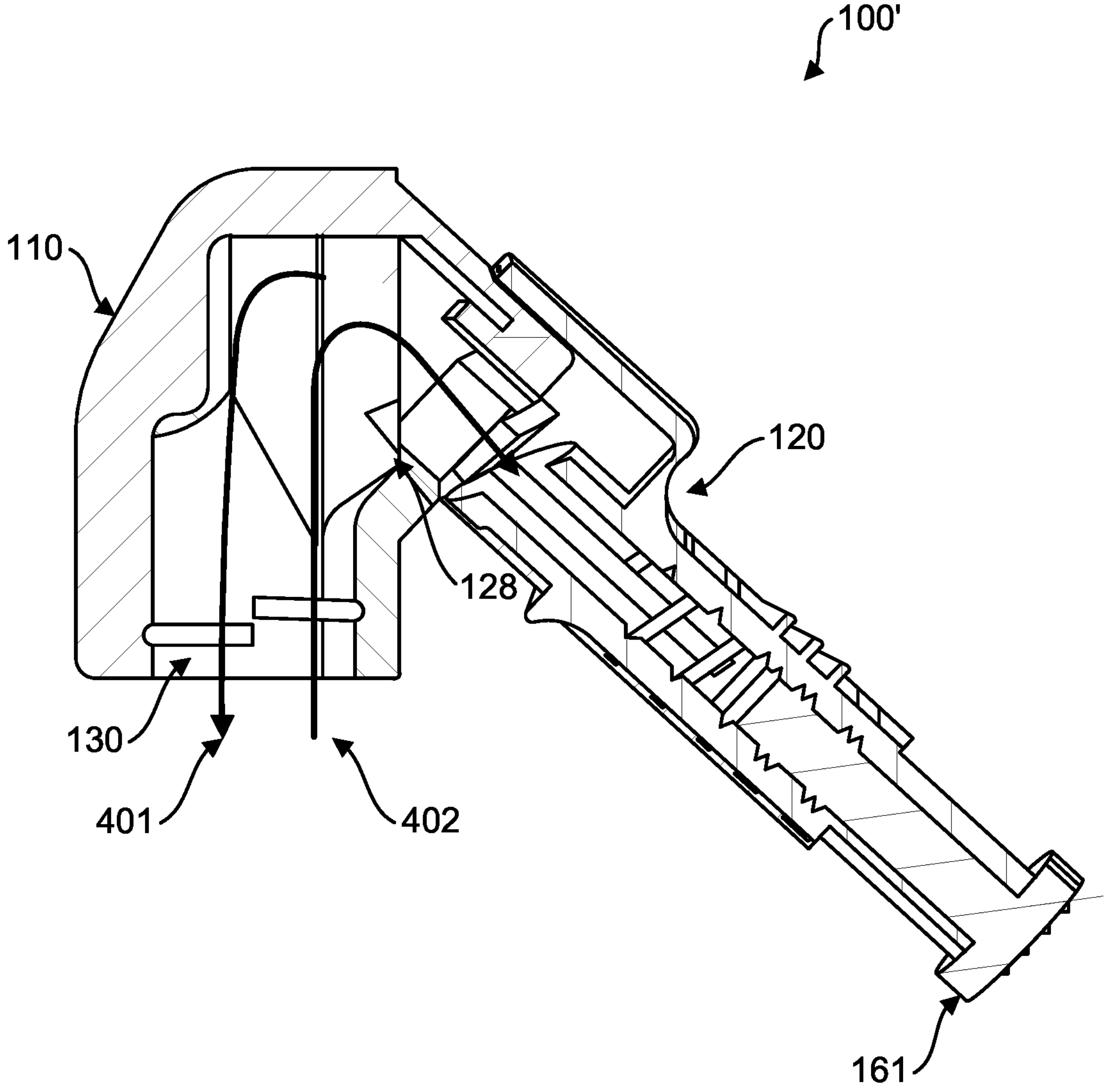
FIG. 4 illustrates a cross sectional view of a device for dispending fluids according to some embodiments disclosed herein.

FIG. 4 illustrates a cross sectional view of a PMD device 100'. As shown in FIG. 4, air can flow in the direction of arrow 401 and fluid can flow along the path shown with arrow 402. For example, a nozzle having a diameter of 1 cm can allow a maximum flow rate of 0.031 ml/s. However, if an air return path is present, this can generate an additional driving force for pushing the fluid out of the bottle, due to atmospheric pressure as well as buoyancy of the lighter air. Embodiments disclosed herein incorporate this air path return into by adding atmospheric pressure to the driving force ($P_{atm}$). This can increase the flow rate through a 1 cm nozzle to 2618 ml/s. This result assumes Pouseille circular flow, and permits an approximation of expected flow rates.

As noted, the PMD device 100' can use a spacious reservoir to overcome the problem of low flow rates due to air return. For example, a large outlet nozzle size and adequate supply of air within the cap can yield air return. The large outlet nozzle can prevent the clogging of the outflow port with fluid, maintaining a path for continuous air connection between inside the bottle and the atmospheric environment outside. Upon tilting of the device, air can flow into the chamber, allowing the fluid to flow out the outflow tract. The creation of the reservoir and maximization of outlet nozzle size in the PMD can effectively increase fluid flow rates and prevented air lock. For example, empirical tests (e.g., 35 different experiments) with different users can show flow rates between 0.5 ml/s and 1.7 ml/s under normal usage conditions across three different viscosities (e.g., 1 cP, 450 cP, 1010 cP).

Figure 5A:
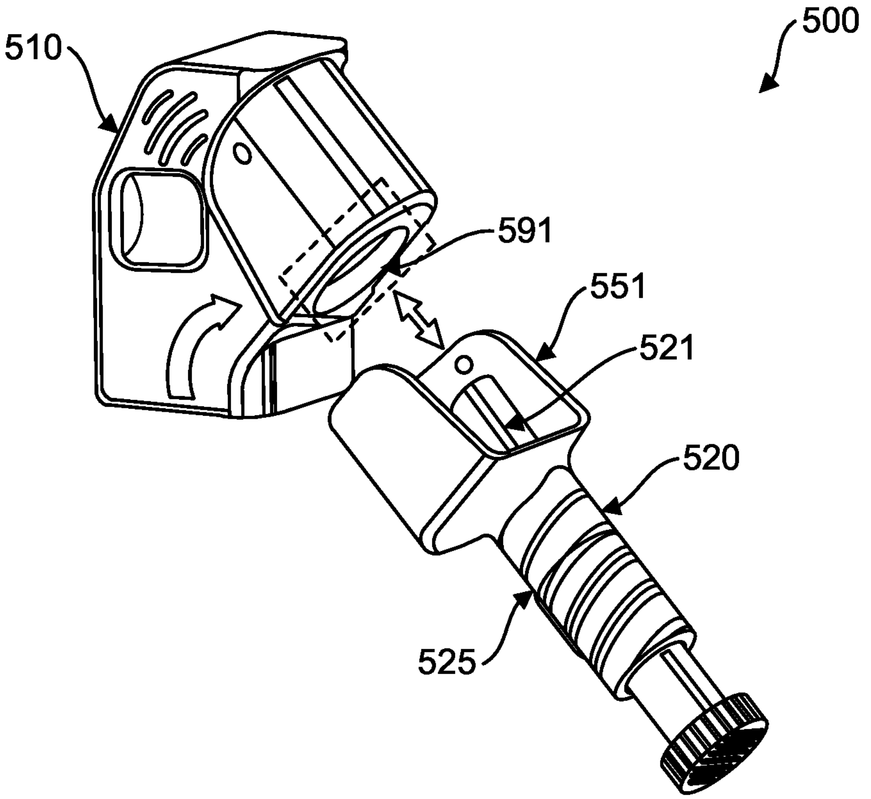
FIGS. 5A-5B illustrate a device according to some embodiments disclosed herein that includes a seal for preventing leakage of fluids.
Figure 5B:
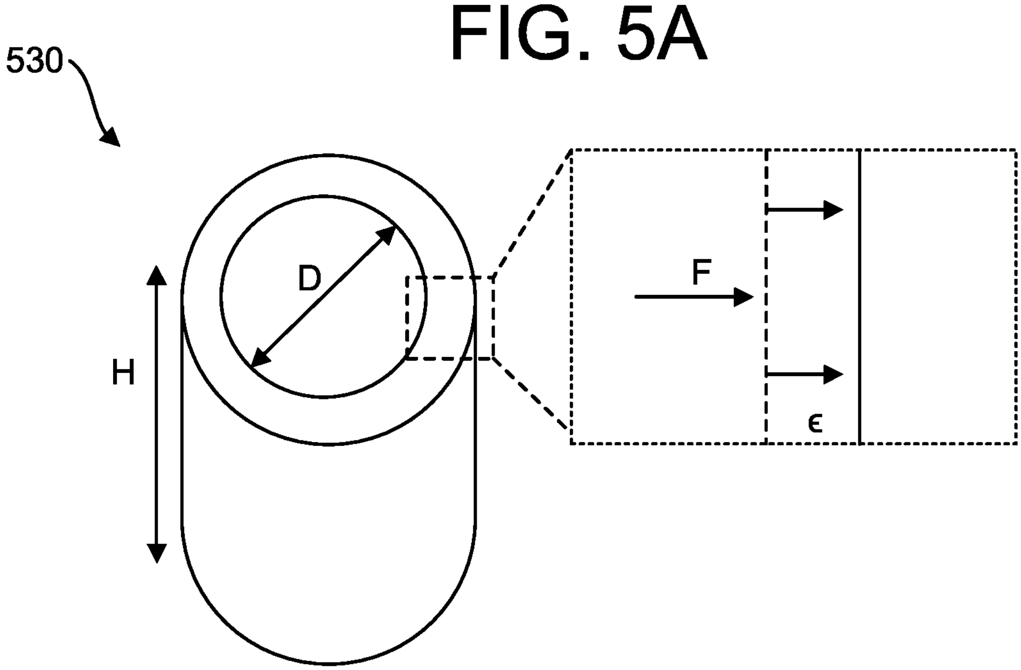

FIGS. 5A-5B illustrate a device 500 according to some embodiments disclosed herein that includes a seal for preventing leakage of fluids. As noted above, leakage can be a significant concern when handling fluids in multi-component devices. This can be especially true for fluids, which can become sticky and difficult to clean once dry. As shown in FIG. 5A, the cap 510 of the device 500 can include a circular interface 591 that is configured to be coupled with a portion 521 of the barrel 525 that extends into the spoon feature 551 of the dispenser 520. The cap 510 is configured to seal the single circular interface 591 between the dispenser 520 and the cap 510 to reduce the occurrence of leaks. As shown in FIG. 5B, a seal 530 (e.g., a rubber seal) can be incorporated in the connection point between the dispenser 520 and the cap 510.

The seal 530 can be a simple thin-walled tube having a predetermined strain. For example, the seal 530 can have a frictional force, f, wherein:

$$dF=\sigma dA,$$

$$f=u_s F=u_s E\epsilon\pi DH.$$

Using the above relationships, the frictional force, f required to overcome this stress and remove the dispenser from the cap can be calculated. For a rubber-plastic interface, a coefficient of friction can be $\mu$=0.8, and an elastic modulus can be E=2.5 MPa. The height, H, and diameter, D, of the interface can be configured such that the seal 530 can undergo a 15%-25% strain once the spoon feature 551 is inserted. Under this strain, there is sufficient compression of the rubber to prevent fluid from leaking past the seal 530. Further, the resulting force required to detach the dispensing unit from the cap can be configured to be in the range of 13-19N, which is well within the bounds of force normally exerted to open bottle caps. Overall, this design can ensure a tight seal in the device without compromising the ease of detaching the components. FIG. 5B illustrates the strain E applied on an infinitesimal portion of a circular seal and frictional normal force F applied as a result of this strain.

Further, addition of a top-heavy component to a plastic bottle (e.g., viscous liquid container) can form a potentially unstable system. As the bottle becomes emptier, the propensity to tip over can increase and potentially lead to a spill, if/when the dispenser was detached from the cap. The standard weighted center of mass equation can be used to formulate the critical angle at which the bottle can tip over:

$$x_{CM}=\frac{1}{M}\sum_{i=1}^{n}m_i x_i$$

where m is the mass of each component, x is the respective coordinate from a reference origin, and M is the total mass of the system. To maximize the tipping angle, while accounting for the other constraints of the design, the mass of the PMD around the central axis of the bottle can be symmetrically distributed. For example, the portion of cap 110 opposite to the side that interfaces with dispenser 120 can be weighted heavier, allowing for a more stable combined system. In some embodiments, the resultant tipping angle can be 23 degrees when the bottle is full and can reduce to 14 degrees when the bottle is empty.

Figure 6A:
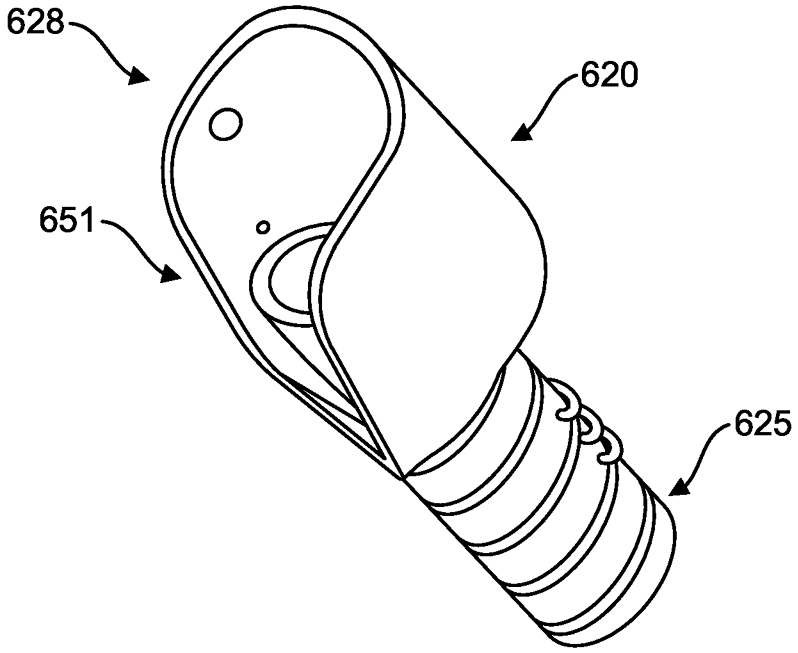
FIGS. 6A-6B illustrate an example of a dispenser and volume control feature of a device for dispending fluids according to some embodiments disclosed herein.
Figure 6B:
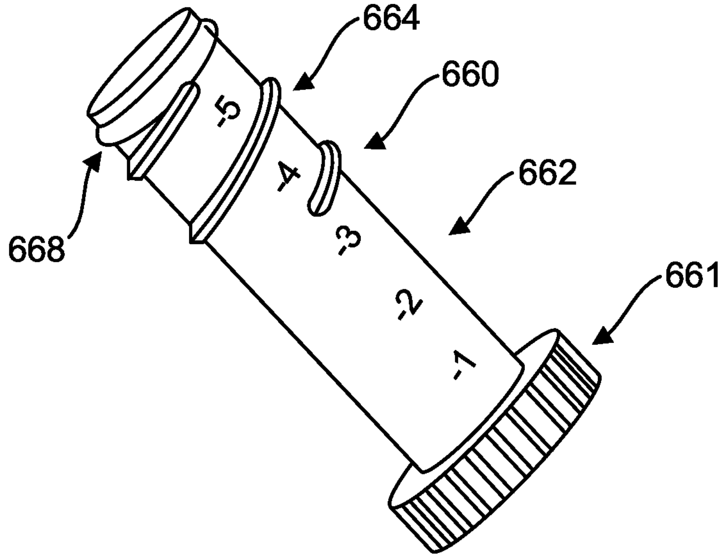

FIGS. 6A-6B illustrate an example of a dispenser 620 and volume control component 660 that can be used with some embodiments disclosed herein. As noted above, the volume control component 660 can be an adjustable screw configured for use in setting an intended volume for the viscous fluid being dispensed. The volume control component 660 and the barrel 625 can be configured such that they provide the device with balance, ease of use, resolution of volume measurement, and sealing. In some embodiments, the volume control component 660 can be configured such that every half turn of the volume control component 660 is equivalent to a predetermined amount of change in the volume (e.g., 0.5 ml of volume change). This volume/number of turns ratio can balance the accuracy of the device with its propensity for tipping. Specifically, decreasing the radius of the screw barrel can yield a device with greater resolution since a greater turn of the screw can be required per unit volume. However, decreasing the diameter of the screw barrel can proportionally increase the length of the screw, resulting in an increase in the dimensions of the device, and moving the center of mass of the device away from the center of mass of the bottle, increasing the likelihood of tipping. Some embodiments disclosed herein balance these two factors to arrive on a radius that requires a 360° turn for each milliliter, a convenient dimension from the user perspective as well.

The barrel 625 can include five complete female-type threads. In the embodiment shown in FIG. 6A, to reduce friction and the force required to turn the screw, only two complete male-type threads 664 are present on the screw. The starting location of these male-type threads 664 can be fixed such that the screws are engaged for complete range of volume (e.g., 1-5 ml, shown in FIG. 5B). This can also mitigate fluid leakage.

An O-ring 668 placed at the end of the screw part can act as a seal. Since the male type threads are always engaged after the O-ring, an intact seal can generated by combining an O-ring with the male-female threads.

As noted above, a PMD device according to some embodiments disclosed herein can also include one or more ergonomic features that facilitate handling of the device. For example, as shown in FIG. 6B, the device can include a volume adjuster screw 661 that is designed to facilitate handling of the device.

Further, as noted previously, the dispenser 620 can include a spoon feature 651 configured to minimize fluid loss. The spoon feature 651 of the dispenser 620 can include a rounded edge 628 to allow the user to directly administer the liquid (e.g., medication into the mouth of a patient). Moreover, the rounded edge 628 can prevent fluid adhesion when compared to similarly structured sharp or linear edges.

Furthermore, in some embodiments, the PMD can comprise a clear or transparent material (e.g., plastic) that enables the user to visualize the flow of fluid and confirm the level of fluid in the dispenser. The transparent material can be configured to allow easy detection of issues that may be present in the cap or dispenser. For example, the user can visually inspect the PMD device to determine if the bottle is empty, the cap is not properly functioning, or the detachable dispenser is not entirely filled. This ability to visually confirm the dose can add a level of safety in administration of medications.

Moreover, the integrated measuring and administration components of the PMD device are configured to prevent loss and/or separation of device from medication. Syringes and measuring cups are commonly lost since they are not required to close the medication bottle. The PMD device inherently prevents the user from losing device parts that are essential to the measurement of dose because it can screw directly on the bottle and can require the dispenser to be re-attached after use to close the system.

Figure 7:
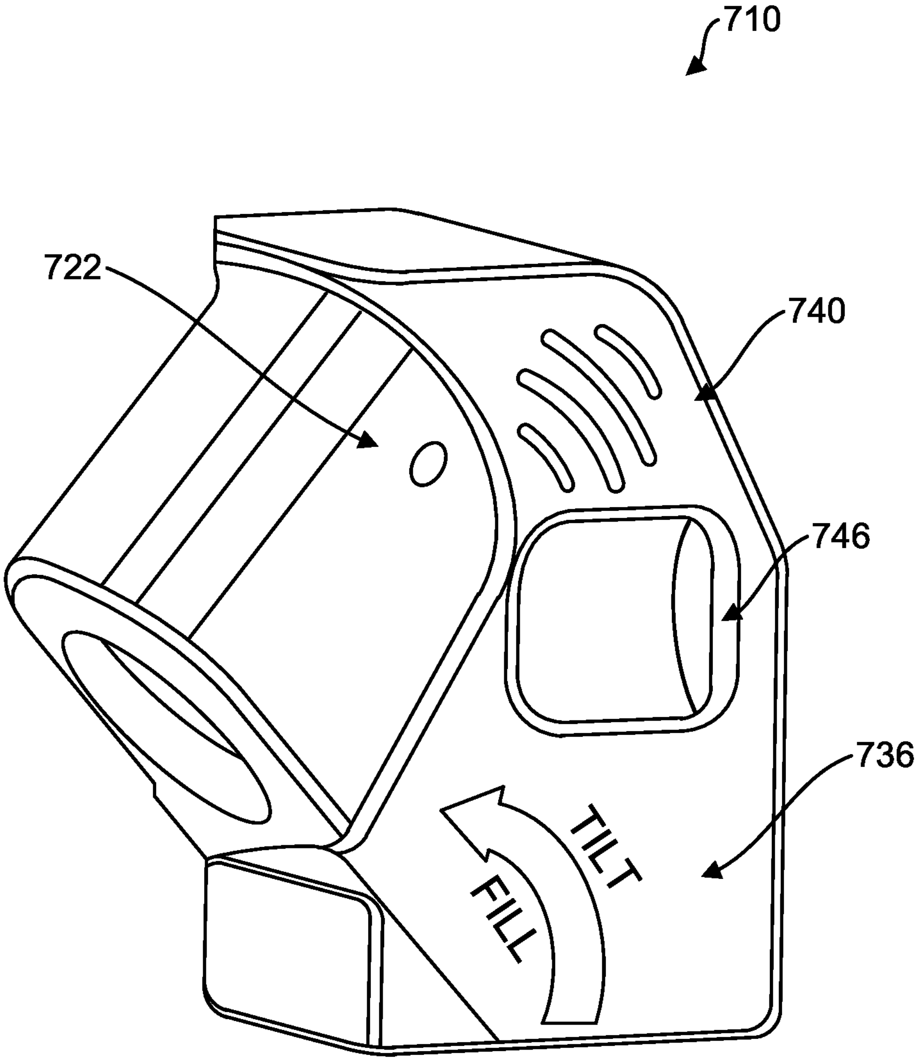
FIG. 7 illustrates an example of a cap of a device for dispending fluids according to some embodiments disclosed herein.

As shown in FIG. 7, the cap 710 of the PMD device can be sized to fit into the average palm and incorporate finger and handle grips 740, 746 as well as instructive labeling 736. The device can also include one or more child safety or child lock features 722. For example, a threading can incorporated into the cap 710 to add a layer of safety to prevent accidental opening by children. A notched lock can also be provided in the dispenser-cap interface to provide additional protection against accidental opening by a child.

Figure 8A:
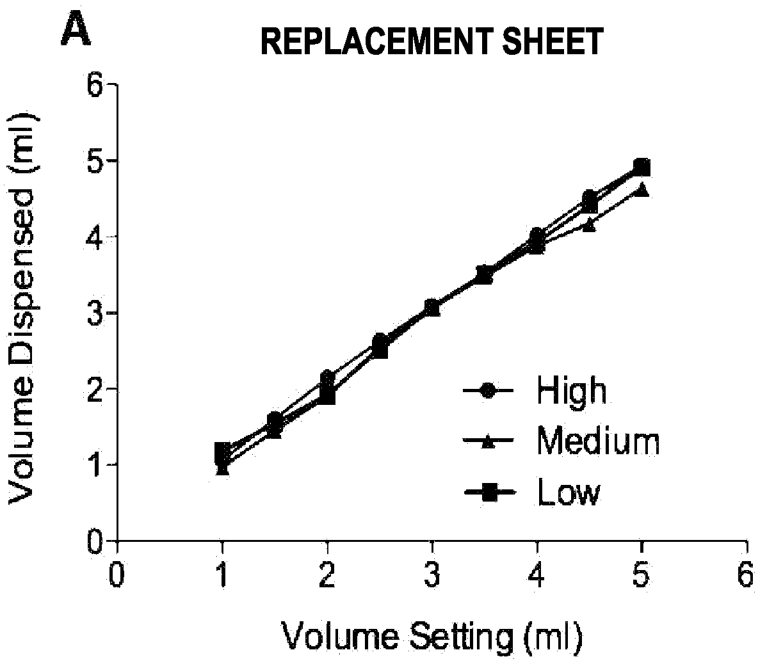
FIGS. 8A-8B illustrate the results obtained from bench-top testing a PMD device according to some embodiments disclosed herein.
Figure 8B:
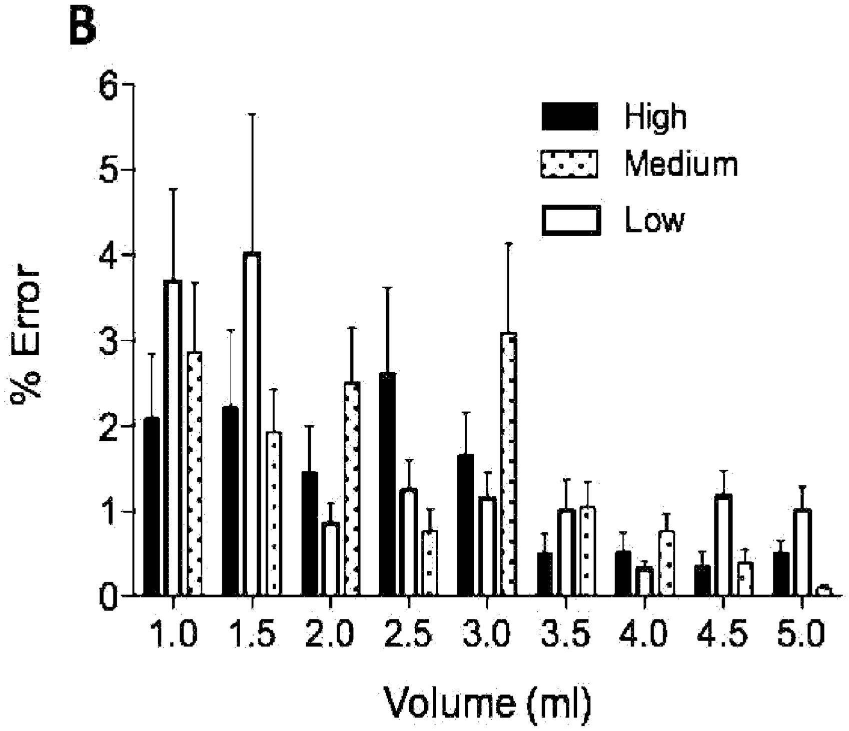

FIGS. 8A-8B illustrate the results obtained from bench-top testing a PMD device according to some embodiments disclosed herein. Specifically, FIG. 8A illustrates the accuracy and FIG. 8B illustrates the precision of the PMD in dispensing liquids of varying viscosity (low, $\mu$=1 cP; medium, $\mu$=450 cP; high, $\mu$=1010 cP) in 0.5 ml increments from 1 ml to 5 ml. The accuracy of the device at each dispensing volume from 1 ml to 5 ml in increments of 0.5 ml is tested. This test is performed with liquids spanning the range of viscosities commonly found in medication: 1 cP (deionized water), 450 cP, and 1010 cP (Children's Motrin®). Each solution is dispensed into a beaker using the PMD and placed on a bench top balance to measure the actual volume dispensed. As seen in FIGS. 8A-8B, the device is accurate (within 5% of desired volume) in dispensing from 1 ml to 5 ml for all 3 solutions. Significantly, the volume dosed by the cap is consistent, with <5% error at all volumes, and <1% error for volumes 3.5 ml and above.

Further, user study of 25 individuals using a PMD device as described herein to dispense 5 mL of fluid only demonstrated a single instance of spillage. In a separate trial (n=35), a syringe and the PMD device were used to measure volumes of water and liquid Motrin® medication ranging between 4-5 mL. In this volume range, the cap is most prone to problems associated with airlock and bubbles. When measuring water, bubbles were identified in 6 cases in the syringe and zero cases in the PMD device. Using liquid Motrin®, there were 14 cases of airlock in the traditional syringe, and 3 in the PMD device. Additionally, in 11 trials, the syringe failed to measure volumes within a tolerance of 25% of the intended volume due to airlock at the interface of the medication and the plastic tip. This experiment demonstrates the efficacy of the PMD device in preventing airlock.

The device can also be easily cleaned using soap and water to prevent contamination of the medication. In bench-top tests, numerous users washed the device under running water and left them out to dry. No residues or crystallization of compounds at any interface or surface was observed.

Figure 9:
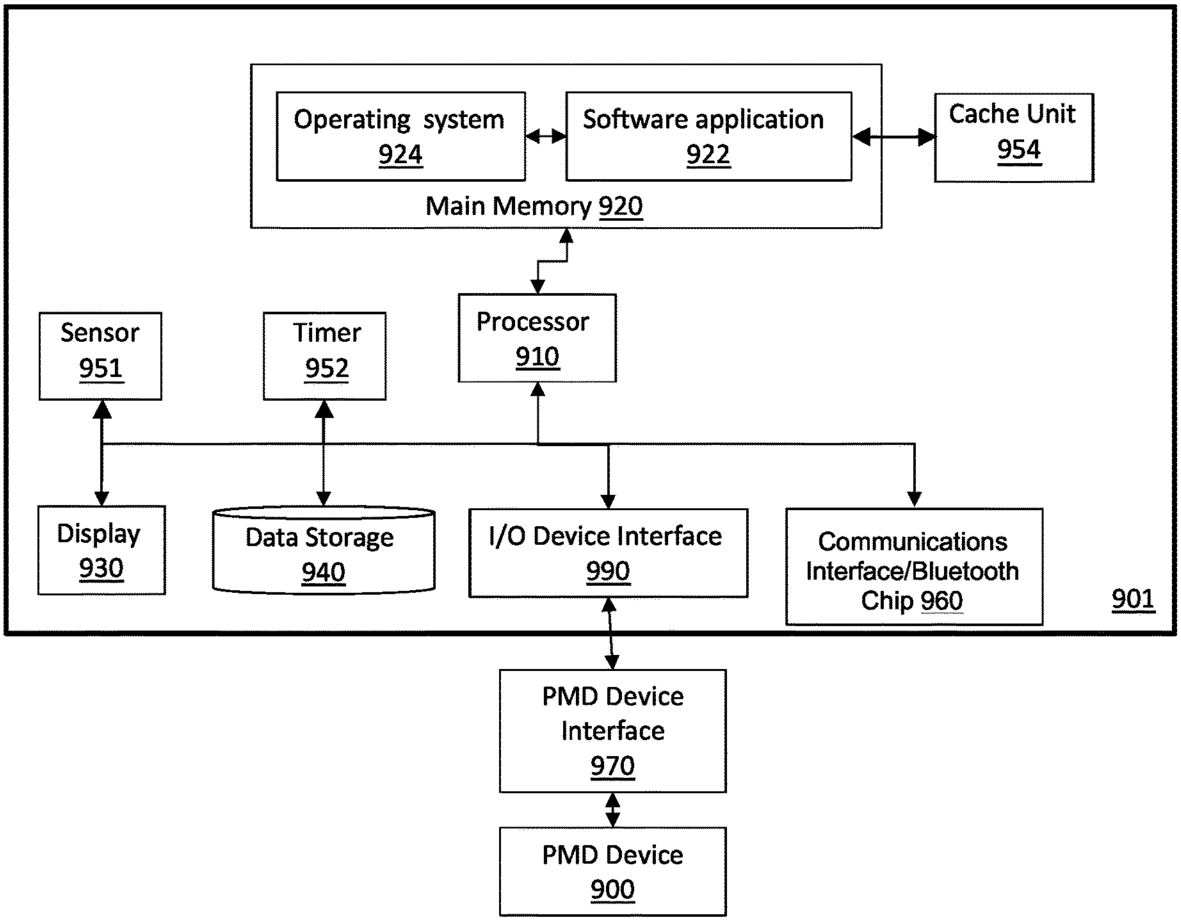
FIG. 9 is an example illustration of digital electronic circuitry or computer hardware that can be used with the embodiments disclosed herein.

As shown in FIG. 9, the PMD device 900 can further include a processor 910 that is configured to monitor the operation of the PMD device 900, send and/or receive signals regarding the operation of the PMD device 900, and/or control the operation of the PMD device 900. For example, the processor 910 can be configured to monitor and/or control the amount of the liquid dispensed and/or the time at which the liquid is dispensed. The processor 910 can also collect or receive data regarding the operation of the device and/or store or forward the data to another entity (e.g., a medical facility, etc.). The processor 910 can also be configured to issue signals that notify a user of appropriate time for dispensing the fluid.

The processor 910 can be any suitable processor available in the art. For example, as shown in FIG. 9, which illustrates a high-level block diagram of the components that can be used in the PMD device 900, the processor can be part of a system 901, implemented in any suitable manner. Further, the system 501 need not to be directly included in or coupled to the PMD device 900 and can be partially or completely independent of the PMD device 900 and connect to the PMD device 900 using any suitable means available in the art.

As noted, the system 901 can comprise to a processor 910 that carries out some of the functions described herein, such as PMD device data analysis, interpretation, tracking, and reporting. Generally these functions can be carried out and implemented by any suitable computer system and/or in digital circuitry or computer hardware. The processor 910 can implement and/or control the various functions and methods described herein. For example, the processor 910 can implement application software and procedures that obtain, record, analyze, and/or report information every time the PMD device 900 is operated and/or track the time intervals (e.g., dosing times) at which the PMD device 900 should be operated. The processor 910 can be connected to a main memory 920. The processor 910 and the main memory 920 can be included in or supplemented by special purpose logic circuitry.

The processor 910 can include a central processing unit (CPU) that includes processing circuitry configured to manipulate instructions received from the main memory 920 and execute various instructions. For example, the processor 910 can be a general and/or special purpose microprocessor and any one or more processors of any kind of digital computer. Generally, the processor 910 can be configured to receive instructions and data from the main memory 920 (e.g., a read-only memory or a random access memory or both) and execute the instructions. The instructions and other data can be stored in the main memory 920.

Further, as shown in FIG. 9, the main memory 920 can include an operating system 924. The main memory 920 and the operating system 924 can be configured to implement various operating system functions. For example, the operating system 924 can be responsible for controlling access to various devices, memory management, and/or implementing various functions of the PMD device 900. The main memory 920 can be any form of non-volatile memory included in machine-readable storage devices suitable for embodying data and computer program instructions. For example, the main memory 920 can be magnetic disk (e.g., internal or removable disks), magneto-optical disks, one or more of a semiconductor memory device (e.g., EPROM or EEPROM), flash memory, CD-ROM, and/or DVD-ROM disks.

The main memory 920 can also hold a software application 922. For example, the main memory 920 and the software application 922 can include various computer executable instructions, application software, and data structures such as computer executable instructions and data structures that implement various aspects of the embodiments described herein. For example, the software application 922 can include various computer executable instructions, application software, and data structures such as computer executable instructions and data structures that can be used to track the times at which the PMD device 900 is used, track and/or limit the amount of fluid device, and alert the user every time the PMD device should be used to dispense liquid.

The main memory 920 can also be connected to a cache unit 954 configured to store copies of the data from the most frequently used main memory 920. The program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

The functions performed by the PMD device 900, such as measuring and dispensing appropriate amount of fluids can be implemented in digital electronic circuitry or in computer hardware that executes software, firmware, or combinations thereof. The implementation can be as a computer program product, for example a computer program tangibly embodied in a non-transitory machine-readable storage device, for execution by, or to control the operation of, data processing apparatus, for example a computer, a programmable processor, or multiple computers.

Further, as shown in FIG. 9, the processor 910 can also be connected to various interfaces via a system or an input/output (I/O) interface 990 (e.g., Bluetooth, USB connector, audio interface, FireWire, interface for connecting peripheral devices, etc.). The I/O interface 990 can directly or indirectly connect to the PMD device 900. For example, in the embodiment shown in FIG. 9, the I/O interface 990 connects to the PMD device 900 through an interface 970 of the PMD device 900. Further, any data obtained from the operation of the PMD device 900 (e.g., dosage volume, dosage time) can be stored on a data storage 940 of the system 901.

The system 901 can also include a display 930 that reports appropriate information (e.g., dosage, amount dispensed, time last used to dispense, future time for dispensing the fluid, etc.) to a user. The user can be any suitable person or entity. For example, the user can be a caregiver, a medical practitioner (e.g., a physician or a pharmacist), etc.

The display 930 can be any suitable display available in the art, for example a Liquid Crystal Display (LCD) or a light emitting diode (LED) display. The display can further be a touch screen display that can receive instructions from a user.

The processor 910 can also control the functions of the PMD device 900 in response to instructions received from the main memory 920 and the software application 922. The software application 922 can further include software applications that can store and process the data obtained from the PMD device 900 or control the operations of the PMD device 900. Examples of such processing can include pre-processing, processing, interpreting, and reporting the data. The I/O interface 990 can further be connected to other peripherals, such as one or more speakers for acoustic output, a microphone for acoustic input, or any other suitable peripheral device known in the art.

The processor 910 can also be connected to a communications interface 960. The communications interface 960 can provide the PMD device 900 with a connection to a communications network, such as the Internet. Transmission and reception of data, information, and instructions can occur over the communications network. The communications interface 960 can be provided in the form of a Bluetooth chip 960.

One skilled in the art should appreciate that the PMD device described herein can be configured for use for dispensing medication to one or more patients. The device can also be configured to monitor the amount of fluid (e.g., medication) in the bottle, the amount remaining in the bottle (e.g., based on receiving information about the amount in the original bottle and tracking the amount dispensed) and alert the user that a certain percentage of the fluid has been used (e.g., 10% medication remaining or 90% medication dispensed) and/or alert the user to replace the medication bottle.

Those having ordinary skill in the art will appreciate that various changes can be made to the above embodiments without departing from the scope of the invention. Although this specification discloses advantages in the context of certain illustrative, non-limiting embodiments, various changes, substitutions, permutations, and alterations may be made without departing from the scope of the specification as defined by the appended claims. Further, any feature described in connection with any one embodiment may also be applicable to any other embodiment.

What is claimed is:

1. A system comprising:

a cap comprising:

a first port configured to be coupled to a container holding a fluid therein and receive the fluid from the container;

a second port; and an air reservoir configured to facilitate movement of the fluid through the cap; and a detachable dispenser coupled to the second port of the cap and configured to receive the fluid from the cap, wherein the detachable dispenser comprises a barrel defining a longitudinal direction, wherein, when the detachable dispenser is attached to the cap, the longitudinal direction extends at an angle less than 90 degrees with respect to an axis extending through a center of the first port and extending in a first direction normal to a bottom surface of the cap, and wherein the cap also comprises a display configured to alert a user of at least one of amount of the fluid to dispense using the system and time for dispensing the fluid using the system.

2. The system of claim 1, wherein the detachable dispenser comprises a spoon configuration.

3. The system of claim 1, further comprising an adjustable volume control component coupled to the barrel and configured to adjust volume of the fluid to a predetermined volume.

4. The system of claim 3, wherein the adjustable volume control component comprises at least one of an adjustable screw configured to adjust volume of the fluid received from the cap by the detachable dispenser, one or more markings serving as guides for adjusting the volume of the fluid to one or more specific volumes, and a seal configured to prevent leakage.

5. The system of claim 4, wherein the one or more markings are etched into the adjustable volume control component.

6. The system of claim 1, wherein the container comprises a screw top container and the first port is configured to be coupled to threads of the screw top container to close the container.

7. The system of claim 1, further comprising at least one visual indicator configured to alert a user to use the system at predetermined time intervals, wherein the visual indicator is positioned on the cap.

8. The system of claim 1, wherein the cap and the detachable dispenser comprise complementary features configured to couple the detachable dispenser to the second port of the cap.

9. The system of claim 1, wherein the cap comprises a lip feature configured to catch spills and leaks of the fluid received from the cap.

10. The system of claim 1, wherein the cap further comprises a sensor configured to monitor at least one of amount of the fluid to dispense using the system and time for dispensing the fluid using the system, the sensor being at least one of: an infrared sensor, an ultrasonic sensor, a mechanical switch, and an electrical switch.

11. A system comprising:
a cap comprising:
a first port configured to be coupled to a container holding a fluid therein and receive the fluid from the container;
a second port; and
an air reservoir configured to facilitate movement of the fluid through the cap; and
a detachable dispenser coupled to the second port of the cap and configured to receive the fluid from the cap,
wherein the detachable dispenser comprises a barrel defining a longitudinal direction, wherein, when the detachable dispenser is attached to the cap, the longitudinal direction extends at an angle less than 90 degrees with respect to an axis extending through a center of the first port and extending in a first direction normal to a bottom surface of the cap, and wherein the cap further comprises at least one visual indicator configured to alert a user to use the system at predetermined time intervals.

12. A system comprising:
a cap comprising:
a first port configured to be coupled to a container holding a fluid therein and receive the fluid from the container;
a second port; and
an air reservoir configured to facilitate movement of the fluid through the cap; and
a detachable dispenser coupled to the second port of the cap and configured to receive the fluid from the cap,
wherein the detachable dispenser comprises a barrel defining a longitudinal direction, wherein, when the detachable dispenser is attached to the cap, the longitudinal direction extends at an angle less than 90 degrees with respect to an axis extending through a center of the first port and extending in a first direction normal to a bottom surface of the cap, and wherein the cap further comprises a sensor configured to monitor at least one of amount of the fluid to dispense using the system and time for dispensing the fluid using the system, the sensor being at least one of an infrared sensor, an ultrasonic sensor, a mechanical switch, and an electrical switch.

* * * * *